US 12,079,915 B2

(12) United States Patent
O'Brien (10) Patent No.: US 12,079,915 B2
(45) Date of Patent: Sep. 3, 2024

(54) SYNCHRONIZING DISPLAY OF MULTIPLE ANIMATIONS (71) Applicant: Apple Inc., Cupertino, CA (US)

(72) Inventor: Sean P. O'Brien, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/826,829

(22) Filed: May 27, 2022

(65) Prior Publication Data

US 2022/0292755 A1 Sep. 15, 2022

Related U.S. Application Data (63) Continuation of application No. 16/653,072, filed on Oct. 15, 2019, now Pat. No. 11,380,040, which is a continuation of application No. 15/274,011, filed on Sep. 23, 2016, now abandoned.

(51) Int. Cl.
| | |
|---|---|
| *G06T 13/80* | (2011.01) |
| *G06F 3/0346* | (2013.01) |
| *G06F 3/0481* | (2022.01) |
| *G06F 3/0483* | (2013.01) |
| *G06F 3/04845* | (2022.01) |
| *G06F 3/0485* | (2022.01) |
| *G06F 3/04883* | (2022.01) |
| *G09G 5/00* | (2006.01) |

(52) U.S. Cl.
CPC ............ *G06T 13/80* (2013.01); *G06F 3/0346* (2013.01); *G06F 3/0481* (2013.01); *G06F 3/0483* (2013.01); *G06F 3/04845* (2013.01); *G06F 3/0485* (2013.01); *G06F 3/04883* (2013.01); *G06F 2203/04808* (2013.01); *G09G 5/00* (2013.01); *G09G 2340/14* (2013.01)

(58) Field of Classification Search
None
See application file for complete search history.

(56) References Cited

U.S. PATENT DOCUMENTS

| | | | |
|---|---|---|---|
| 6,072,503 | A | 6/2000 | Tani et al. |
| 6,369,821 | B2 | 4/2002 | Merrill et al. |
| 7,616,203 | B1 | 11/2009 | Asente |
| 8,104,048 | B2 | 1/2012 | Jalon et al. |
| 8,350,858 | B1 | 1/2013 | Ranganathan |
| 8,427,484 | B1 | 4/2013 | Kass et al. |
| 8,836,658 | B1 | 9/2014 | Jia et al. |
| 9,207,093 | B2 | 12/2015 | Barrett et al. |
| 9,275,028 | B2 | 3/2016 | Migos et al. |
| 9,303,997 | B2 | 4/2016 | Mcgavran et al. |

(Continued)

*Primary Examiner* — Anh-Tuan V Nguyen
(74) *Attorney, Agent, or Firm* — Invoke (57) ABSTRACT

Some embodiments of the invention provide a method for concurrently presenting two synchronized animations based on an input value that is received through an input interface of a device. The method defines, based on the received input, a first animation that presents a first animated object, and then uses a set of attributes of the first animation to define a second animation that presents a second animated object. The method then displays at least portions of the first and second animations concurrently. In some embodiments, the method displays the first and second animations on a display screen of the device, or on a display screen connected to the device.

26 Claims, 9 Drawing Sheets (56) References Cited

U.S. PATENT DOCUMENTS

| | | |
|---|---|---|
| 9,612,714 B2 | 4/2017 | Moore |
| 2003/0222994 A1 | 12/2003 | Dawson |
| 2004/0027352 A1 | 2/2004 | Minakuchi |
| 2008/0070666 A1 | 3/2008 | Gatto et al. |
| 2008/0165161 A1 | 7/2008 | Platzer et al. |
| 2009/0178007 A1* | 7/2009 | Matas ............... G06F 3/04886 715/835 |
| 2009/0228784 A1 | 9/2009 | Drieu et al. |
| 2010/0175018 A1* | 7/2010 | Petschnigg ............ G06F 3/017 715/776 |
| 2010/0175027 A1 | 7/2010 | Young et al. |
| 2010/0238182 A1 | 9/2010 | Geisner et al. |
| 2011/0145738 A1 | 6/2011 | Laugwitz et al. |
| 2011/0153186 A1 | 6/2011 | Jakobson |
| 2011/0181520 A1* | 7/2011 | Boda .................... G06F 1/1645 345/173 |
| 2011/0193788 A1 | 8/2011 | King et al. |
| 2012/0166998 A1* | 6/2012 | Cotterill ............... G06F 3/0483 715/780 |
| 2012/0262462 A1 | 10/2012 | Montan et al. |
| 2013/0091462 A1 | 4/2013 | Gray et al. |
| 2013/0111395 A1 | 5/2013 | Ying et al. |
| 2013/0117698 A1 | 5/2013 | Park et al. |
| 2013/0151149 A1 | 6/2013 | Kristinsson et al. |
| 2013/0159914 A1* | 6/2013 | Grigoryev ............ G06F 3/0483 715/776 |
| 2013/0225295 A1 | 8/2013 | Lee |
| 2013/0271473 A1 | 10/2013 | Duran |
| 2013/0290818 A1 | 10/2013 | Arrasvuori et al. |
| 2013/0321444 A1 | 12/2013 | Efrati et al. |
| 2013/0325319 A1* | 12/2013 | Moore ............... G01C 21/3664 701/417 |
| 2013/0328887 A1 | 12/2013 | Shaffer et al. |
| 2014/0007005 A1 | 1/2014 | Libin et al. |
| 2014/0033056 A1 | 1/2014 | Kim et al. |
| 2014/0049547 A1 | 2/2014 | Cabanier et al. |
| 2014/0059496 A1 | 2/2014 | White et al. |
| 2014/0096082 A1 | 4/2014 | Zhen et al. |
| 2014/0137032 A1 | 5/2014 | Won et al. |
| 2014/0173466 A1* | 6/2014 | Suri ..................... G06Q 10/107 715/758 |
| 2014/0213342 A1 | 7/2014 | Chen et al. |
| 2014/0278488 A1* | 9/2014 | Moore .................. G06Q 10/10 705/2 |
| 2014/0282124 A1* | 9/2014 | Grealish ............... G06T 11/206 715/762 |
| 2014/0310655 A1 | 10/2014 | Sims |
| 2014/0365882 A1 | 12/2014 | Lemay |
| 2014/0368512 A1 | 12/2014 | Kim et al. |
| 2014/0380247 A1 | 12/2014 | Tecarro et al. |
| 2014/0380375 A1* | 12/2014 | Yan ................... H04N 21/47202 725/52 |
| 2015/0029197 A1 | 1/2015 | Almosnino et al. |
| 2015/0100892 A1 | 4/2015 | Cronin et al. |
| 2015/0121297 A1 | 4/2015 | Ying et al. |
| 2015/0277749 A1 | 10/2015 | Eggert |
| 2015/0286357 A1 | 10/2015 | Penha et al. |
| 2015/0332322 A1 | 11/2015 | Wu et al. |
| 2015/0339002 A1 | 11/2015 | Arnold et al. |
| 2015/0363092 A1 | 12/2015 | Morton |
| 2016/0070448 A1 | 3/2016 | Krol |
| 2016/0085439 A1* | 3/2016 | Threlkeld ............... G06F 3/033 715/740 |
| 2016/0098972 A1 | 4/2016 | Feit et al. |
| 2016/0132567 A1 | 5/2016 | Dole et al. |
| 2016/0283076 A1 | 9/2016 | Armstrong |
| 2016/0358366 A1 | 12/2016 | Wang et al. |
| 2017/0038930 A1* | 2/2017 | Hayakawa ............ G06T 11/60 |
| 2017/0064289 A1 | 3/2017 | Lo et al. |
| 2017/0168655 A1* | 6/2017 | Jann ...................... G06F 9/451 |
| 2017/0192939 A1 | 7/2017 | Milas |
| 2017/0220216 A1* | 8/2017 | Thompson ............ G06F 3/0483 |
| 2017/0329490 A1* | 11/2017 | Esinovskaya ........ G06F 3/04817 |
| 2018/0273050 A1 | 9/2018 | Tertoolen et al. |
| 2018/0373504 A1 | 12/2018 | Chatty et al. |
| 2020/0043216 A1 | 2/2020 | O'Brien |

* cited by examiner

SYNCHRONIZING DISPLAY OF MULTIPLE ANIMATIONS

INCORPORATION BY REFERENCE; DISCLAIMER

The following application is hereby incorporated by reference: application Ser. No. 16/653,072 filed on Oct. 15, 2019, application Ser. No. 15/274,011 filed on Sep. 23, 2016. The Applicant hereby rescinds any disclaimer of claim scope in the parent application(s) or the prosecution history thereof and advises the USPTO that the claims in this application may be broader than any claim in the parent application(s).

BACKGROUND

Many computing devices today generate animations to show the result of operations performed by their users and to show transitions between different operational stages or modes of the applications that they execute. An animation presented at any given time can include several sub-animations that animate several different objects differently. Visual aberrations result when these sub-animations are not synchronized, and these aberrations detract from a goal of the animations, which is to provide a visually pleasing presentation of an operation or a transition on the device.

SUMMARY

Some embodiments of the invention provide a method for concurrently presenting two animations based on an input value that is received through an input interface of a device. The method first defines, based on the received input, a first animation that presents a first animated object, and then uses a set of attributes of the first animation to define a second animation that presents a second animated object. The method then displays at least portions of the first and second animations concurrently. In some embodiments, the method displays the first and second animations on a display screen of the device, or on a display screen connected to the device.

Based on the received input value, the method of some embodiments defines a first set of values for animating the first object during the first animation. The method then uses a subset of the first set of values to define a second set of values for animating the second object during the second animation. The method of some embodiments then uses the first and second sets of values to display a plurality of successive presentations of the first and second animated objects.

In some embodiments, the first set of values includes values of at least one attribute of the first object, while the second set of values includes values of at least one attribute of the second object. Also, in some embodiments, each attribute value in each object's set of values (i.e., in the first set of values or second set of values) has an associated time-instant value that specifies when the object attribute has that attribute value during the associated animation. In some of these embodiments, the method identifies the second set of values for the second animation by (1) identifying a time-instant value at which the first attribute has a maximum value or a minimum value, and (2) using the identified time-instant value as a start time or end time for the second animation.

In some embodiments, the first and second attributes are position-related or motion-related attributes (e.g., location attributes, velocity attributes, acceleration attributes, etc.) of the first and second objects. In other embodiments, the first attribute is a position-related or motion-related attribute of the first object, while the second attribute is a color attribute (e.g., luminance value, chrominance value, etc.) of the second object. Animating an object (e.g., a page, a map, a card, etc.) by changing its color attribute can cause the object to dim, to brighten, or to otherwise change its color. Animating an object by changing its position or motion-related attribute can cause the object to appear to move or rotate.

The input interface through which the method in some embodiments receives the input value that starts the two animations is a touch input sensor of the device, such as a touch-sensitive display screen of the device or a touch-sensitive peripheral of the device. The touch input in some embodiments is a touch drag operation (e.g., a single finger drag operation or a multi-finger drag operation) for which the touch sensor and its associated software module (e.g., driver, etc.) can generate an input value in a range of three or more values (e.g., 10, 100, or 100 values or more).

In some embodiments, the method defines the first set of values for an attribute of the first object by identifying, based on the input value, a graph that specifies several different values for this attribute over the duration of the first animation. In some of these embodiments, different input values for different touch drag operations cause the method to identify different graphs that specify different sets of values for the first object's attribute at different instants in time. In some embodiments, the method then identifies the second set of values for the second object by (1) identifying a subset of time-instant values during the first animation when the first object's attribute has a particular subset of values (e.g., a maximum value or a minimum value), and (2) defining a start time, an end time, or start and end times of the second animation based on the identified subset of time-instant values.

In some embodiments, the touch drag operation is an operation that the method associates with movement of the first object. Alternatively, in some embodiments, the touch drag operation is a two-finger touch operation that the method associates with a zoom operation with respect to an object displayed on a display screen of the device In still other embodiments, the input interface is a motion sensor of the device, and the input value is a value derived from a motion of the device detected by a motion sensor.

The preceding Summary is intended to serve as a brief introduction to some embodiments of the invention. It is not meant to be an introduction or overview of all-inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method for concurrently presenting two animations based on an input value that is received through an input interface of a device. The method first defines, based on the received input, a first animation that presents a first animated object, and then uses a set of attributes of the first animation to define a second animation that presents a second animated object. The method then displays at least portions of the first and second animations concurrently. In some embodiments, the method displays the first and second animations on a display screen of the device, or on a display screen connected to the device. The method is implemented by the device's operating system or a framework process of this operating system in some embodiments, while in other embodiments, the method is implemented by an application executing on top of the operating system.

Figure 1:
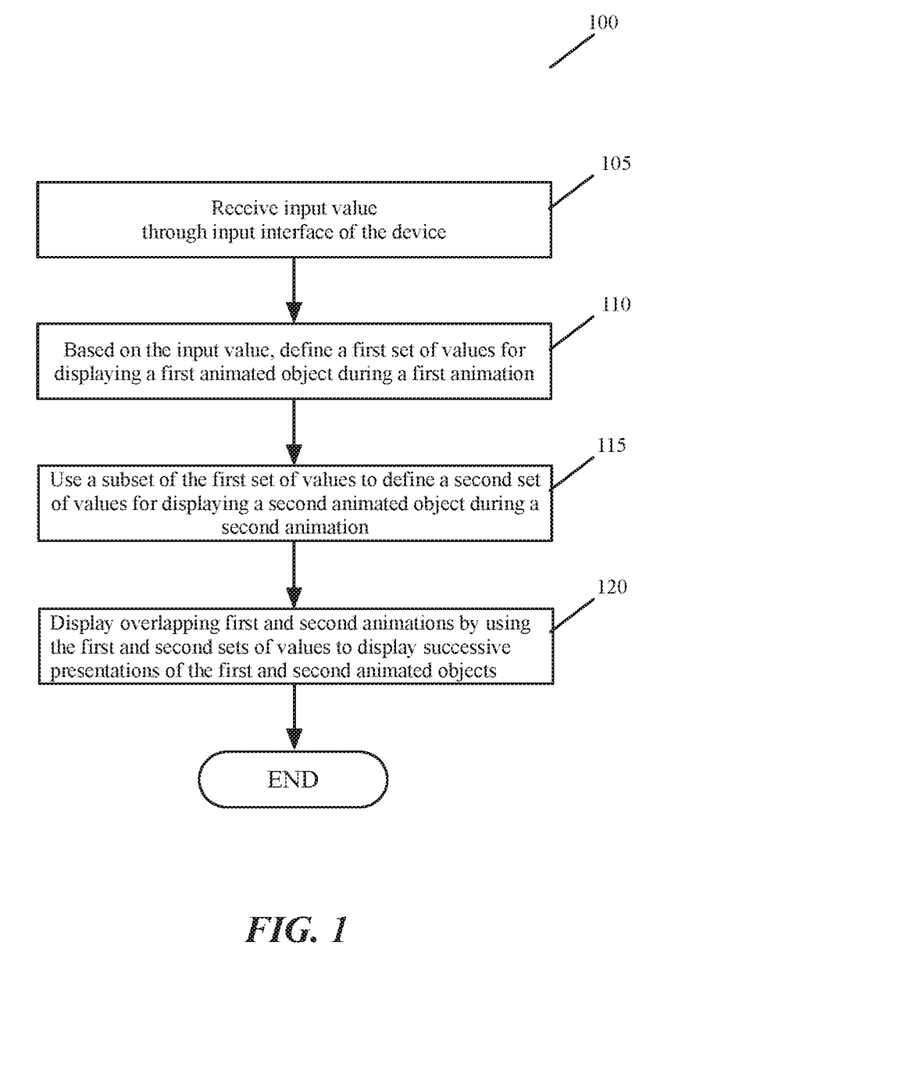
FIG. 1 illustrates an animation-synchronizing process that implements some embodiments of the invention.

FIG. 1 illustrates an animation-synchronizing process 100 that implements one such method of some embodiments. In some embodiments, a computing device performs the process 100 to dynamically define two synchronized animations for at least two objects after receiving an input through its input interface. For instance, in some embodiments, a map application executing on a mobile device performs this process.

The process 100 will be explained below by reference to an example presented in FIG. 2. This example illustrates a map application on a mobile device 200 animating the movement of two objects 212 and 215 based on a touch drag operation that is performed with respect to one of these objects (object 212 in this example). In this example, the two objects are two cards 212 and 215 that are displayed over a map by the map application, which executes on a mobile device 200 with a touch-sensitive display screen.

The first card 212 includes a search field 230 for receiving a search query and a display area 235 for listing predicted locations for displaying on the map 250. In this example, the first card 212 is touch selected and pushed upwards by the touch drag operation. Although the process 100 is described by reference to this example, one of ordinary skill will realize that this process can be implemented by any kind of computing device (e.g., desktop computer, laptop computer, smartphone, tablet, etc.) based on other types of input that are received through other kinds of input interface (e.g., cursor controller, touch sensor, motion sensor, etc.), as further described below.

As shown in FIG. 1, the process 100 starts (at 105) when it receives an input value through an input interface of the device. The input interface can be any one of the input interfaces of the device that executes the process 100. In the example illustrated in FIG. 2, the input interface is the touch input sensor of the touch-sensitive display screen of the mobile device 200. In other embodiments, the input is a touch input that is received through a touch-sensitive peripheral of a device. In still other embodiments, the input interface is another input interface, such as a cursor controller, etc. In some embodiments, the input interface is a motion sensor of the device, and the input value is a value derived from a motion of the device detected by motion sensor.

Figure 2:
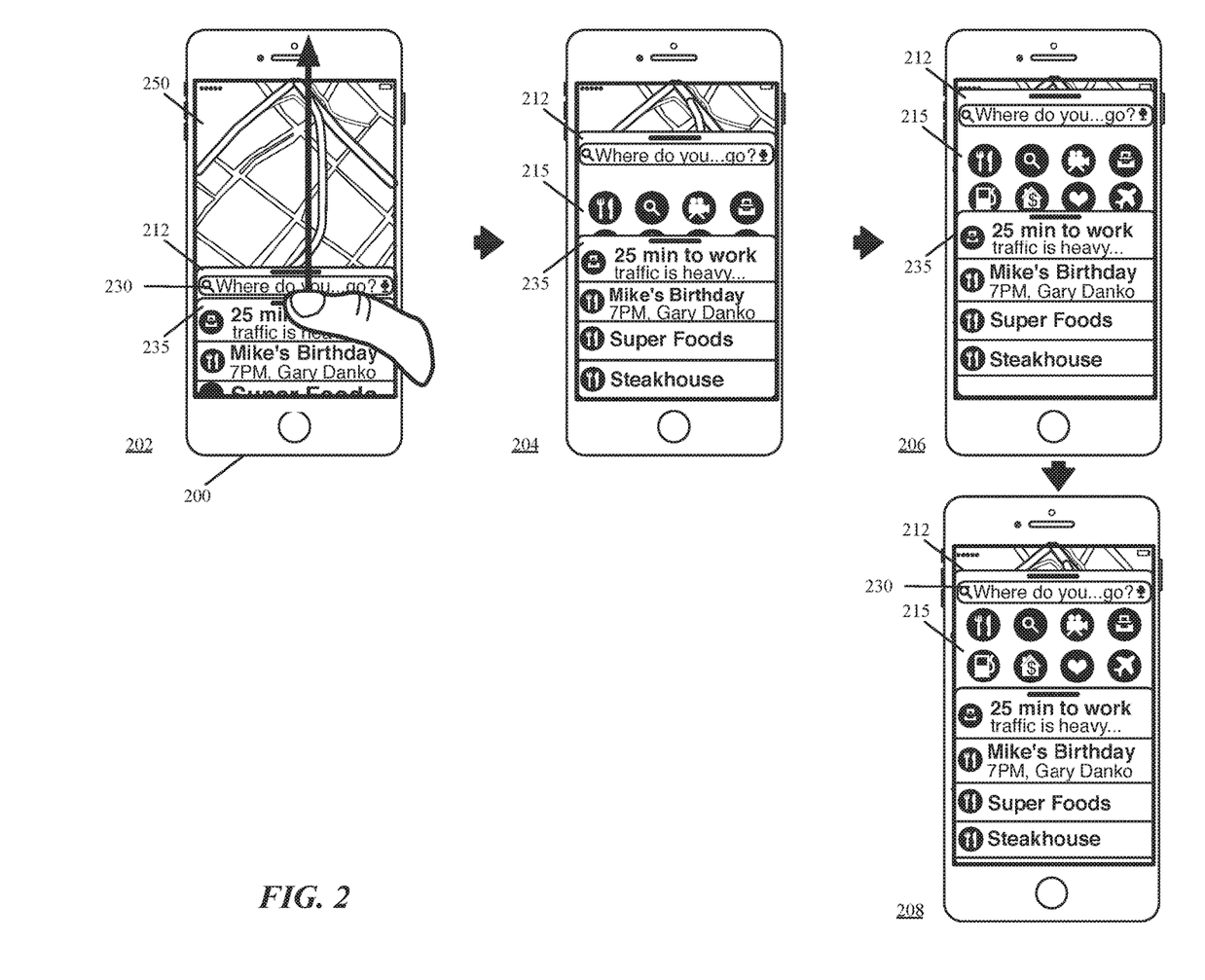
FIG. 2 illustrates an application on a mobile device animating the movement of two objects by using the process of FIG. 1.

Also, in the example illustrated in FIG. 2, the received input value is a velocity value of a touch drag operation on the touch-sensitive screen of the mobile device. This device's touch sensor and associated software module (e.g., driver, etc.) specifies the velocity value from a range of three or more values (e.g., 10, 100, or 100 values or more), based on the detected speed of the user's finger at the moment right before the end of the drag operation (i.e., right before the finger is removed from the screen). In this example, the device's map application associates the drag operation with the first card 212 because the touch location is over this card. In other embodiments, the input that starts the two animations is not associated with one of the two animated objects any more than it is associated with the other animated object. Also, in some embodiments, the touch drag operation causes another type of animation. For instance, in some embodiments, the touch drag operation is a two-finger pinch or spread operation that initiates a zoom-out or zoom-in operation with respect to an object displayed on a display screen of the device.

Based on the received input value, the process 100 defines (at 110) a first set of values for animating the first object during the first animation. In some embodiments, the first set of values includes values of at least one attribute of the first object, and each attribute value has an associated time-instant value that specifies when the first object attribute has that attribute value during the first animation. In some embodiments, the first attribute is a position-related or motion-related attribute (e.g., location, velocity, acceleration, etc.) of the first object. In the example illustrated in FIG. 2, the attribute is the location of the top of the first card 212 which includes the search field 230. For the embodiments illustrated in FIG. 2, the predicted-location list 235 moves upwards at a lower velocity than the search field 230, while in other embodiments, it moves at the same velocity as the search field. Accordingly, in the discussion below, references to the velocity or position of the first card refer to the velocity or position of the top of the first card 212 that includes the search field 230.

In other examples, the attribute for which the first set of values is defined (at 110) is a color attribute (e.g., luminance value, chrominance value, etc.) of the first object. Animating an object (e.g., a page, a map, a card, etc.) by changing its color attribute can cause the object to dim, to brighten, to saturate, to de-saturate, or to otherwise change its color. Animating an object by changing its position or motion-related attribute can cause the object to appear to move or rotate.

To define (at 110) the first set of values for animating the first object during the first animation, the process 100 in some embodiments identifies, based on the input value received at 105, a graph that specifies several different values for this attribute over the duration of the first animation. In some embodiments, the process identifies the graph by using the input value to select or generate the graph from a group of different graphs that specify different sets of values and different types of transitions through these values. In some embodiments, the process uses the received input value to generate the position graph by using an equation that gradually decays the velocity of the first card over a duration of time.

Figure 3:
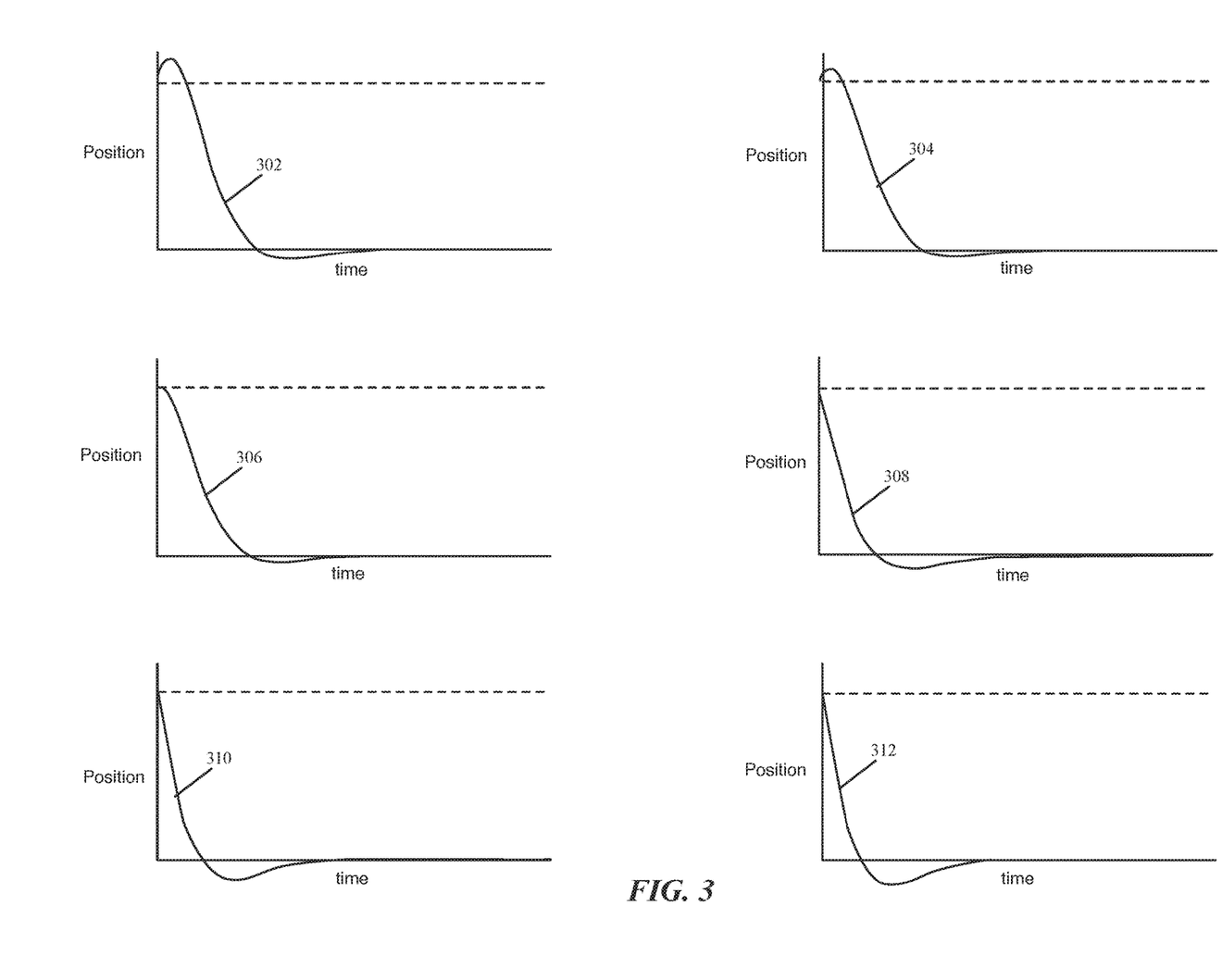
FIG. 3 illustrates different position graphs that specify different sets of positions for the position of a first card at different instants in time.

FIG. 3 illustrates different position graphs that specify different sets of positions for the top of the first card at different instants in time. These graphs are provided for the case when the first card is in its maximized, extended state, and the user selects the card and pushes it down to a smaller display state. In some embodiments, the first card has three steady states, a minimized state that only shows the search field 230 at the bottom of the map, an intermediate state that shows the search field 230 and a few predicted destinations on the list 235, and a maximized state that shows the search field 230 and more predicted destinations on the list 235. Examples of the first card in its intermediate and maximized state are illustrated in the first and fourth stages 202 and 208 of FIG. 2, while an example of the first card in its minimized state is illustrated in the first stage 602 of FIG. 6, which will be further described below. These display states and several different ways for directing the map application to transition between these states are described in concurrently filed U.S. patent application, entitled "Map Application with Novel Search, Browsing and Planning Tools,". This patent application is incorporated herein by reference.

Based on the input velocity value of the touch drag operation, the map application of the mobile device 200 generates one of the graphs illustrated in FIG. 3 to specify the position of the first card 212 during the first animation. These different graphs fall into two classes. The first set of graphs 302 and 304 are for cases where the user pulls up the first card, only to have it snap back to a lower state (i.e., to an intermediate or minimized state). The second set of graphs 306-312 are for the cases when the user pushes down the first card from its maximized state to a smaller intermediate or minimized state.

In each of the graphs illustrated in FIG. 3, the y-axis corresponds to the position of the first card 212 while the x-axis represents time. In FIG. 3, the first two graphs 302 and 304 each includes an initial overshoot hump, which is a result of the first card being pulled up past its steady-state maximized position, and then snapping back down to a smaller intermediate or minimized display state. Each position graph in FIG. 3 includes a final undershoot dip that specifies a range of negative positions. When the object has a negative position for a duration of time towards the end the animation, the animated object has overshot its final position and is either temporarily moving away from this position or moving back towards its final position.

When the card is being pushed down in the example illustrated by FIG. 3, the backward movement of the first card makes this card appear to bounce up once it reaches its lowest position. On the other hand, in the example illustrated in FIG. 2, the backward movement of the first card makes this card appear to bounce down once it reaches its highest location, as further explained below.

After defining a first set of values for the first object during the first animation, the process 100 uses (at 115) a subset of the first set of values to define a second set of values for animating the second object during the second animation. In some embodiments, the second set of values includes values of at least one attribute of the second object, and each attribute value has an associated time-instant value that specifies when during the second animation the second object attribute has that attribute value. In some embodiments, the second attribute is a position-related or motion-related attribute (e.g., location, velocity, acceleration, etc.) of the second object In the examples illustrated in FIGS. 2 and 3, the attribute is the position of the second card 215. In other examples, this attribute might be another position- or motion-related attribute or a color attribute (e.g., luminance value, chrominance value, etc.) of the second object, as further described below by reference to FIGS. 6 and 7.

In some embodiments, the process identities (at 115) the second set of values for the second object by (1) identifying a subset of time-instant values during the first animation when the first object's attribute has a particular subset of values (e.g., maximum value or a minimum value), and (2) using the identified subset of time-instant values to define a start time, an end time, or start and end times of the second animation based on the identified subset of time-instant values. To define (at 115) the second set of values for animating the second object during the second animation, the process 100 in some embodiments generates, based on the graph identified at 110 for the first object, a graph that specifies several different values for an attribute of the second object. This graph for the second object's attribute specifies a changing set of values during the second animation.

Figure 4:
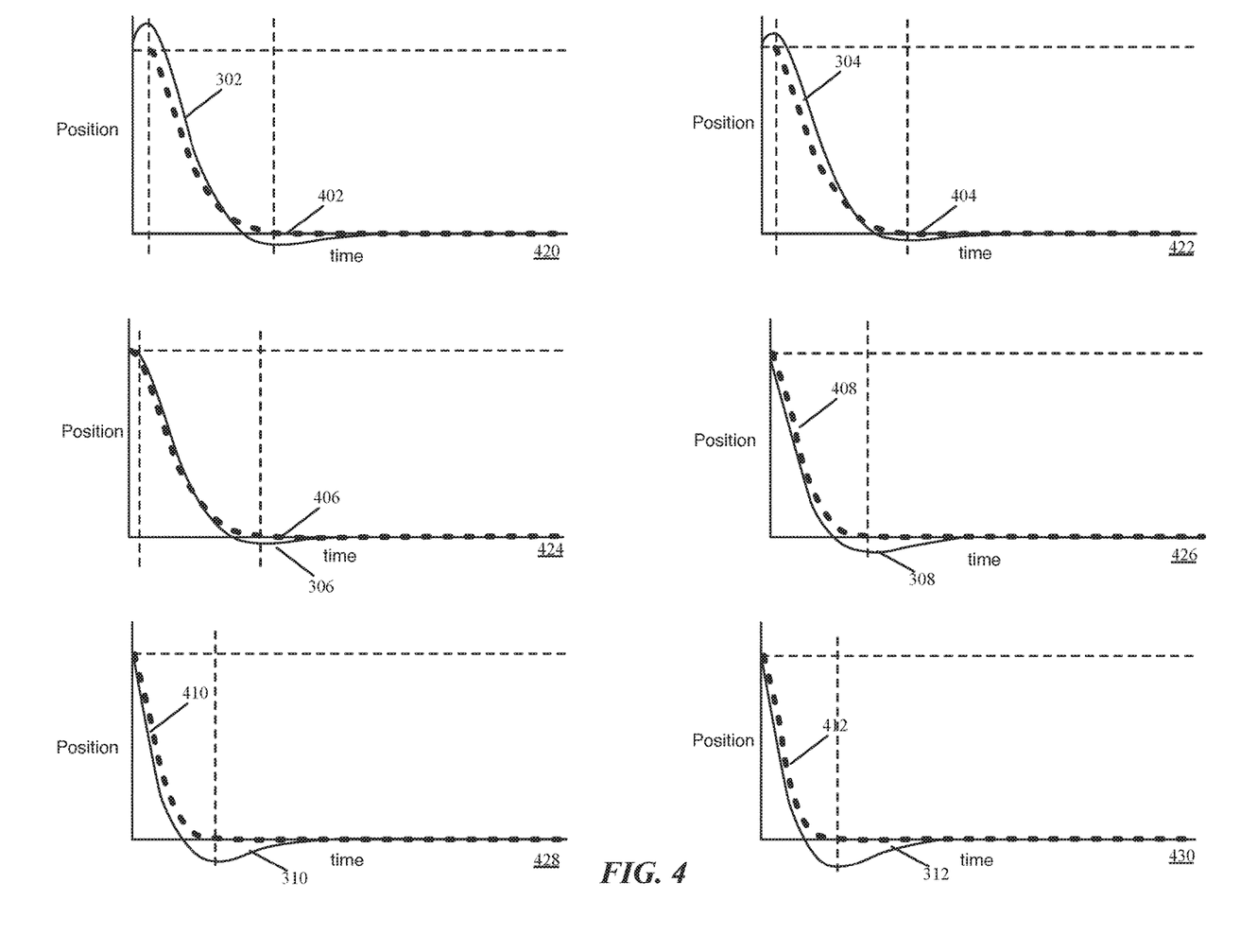
FIG. 4 illustrates several different position graphs that the process of FIG. 1 generates to specify the position of a second card based on different position graphs that it generates to specify the position of the first card.

For the examples illustrated in FIG. 3, FIG. 4 illustrates six different position graphs that the process 100 generates to specify the position of the second card 215 based on different position graphs that it generates to specify the position of the first card 212. Specifically, this figure shows six pairs of graphs 420-430. In each pair of graphs, the position graph 302-312 for the first card is shown as a solid curve, while the position graph for the second card 402412 is shown as a dashed curve. Also, in FIG. 4, the position graphs for the first card are the same as the position graphs of FIG. 3 as reflected by the common reference numbers 302-312 reflected in both figures.

FIG. 4 shows that when the first card's position graph has an initial overshoot hump, the process in some embodiments generates the position graph for the second card that specifies movement of the second card when the first card's position graph has reached its maximum value (i.e., reaches the top of the initial overshoot hump). The second card position graphs 402 and 404 of FIG. 4 illustrate the start of the second card's movement after the first card's corresponding position graph 302 and 304 reaches its maximum value during their initial overshoot humps.

FIG. 4 also shows that when the first card's position graph has a final undershoot dip, the process in some embodiments generates the position graph for the second card so that the second card reaches it final resting position when the first card's position graph has its minimum value in its undershoot (i.e., has reached the bottom of its undershoot dip). Each of the second card position graphs 402-408 illustrates that the second card reaches its final resting position when the first card's corresponding position graph reaches its lowest position during its undershoot dip.

By having the second card's position graph reach its final resting position when the first graph reaches its lowest position in its undershoot dip, the second graph ensures that the second card does not start a bounce effect just as the first card has reached its maximum bounce down position and thereby avoids visual aberration that would result from showing two asynchronous bounce animations for the first and second cards 212 and 215. The graphs 406, 408, 410, and 412 of FIG. 4 show the second card's position when the first card is not initially pushed up. As shown by these graphs, the second card's position graph in certain cases has the second card start to move towards its destination location after the first card has started to move towards its final destination.

Figure 5:
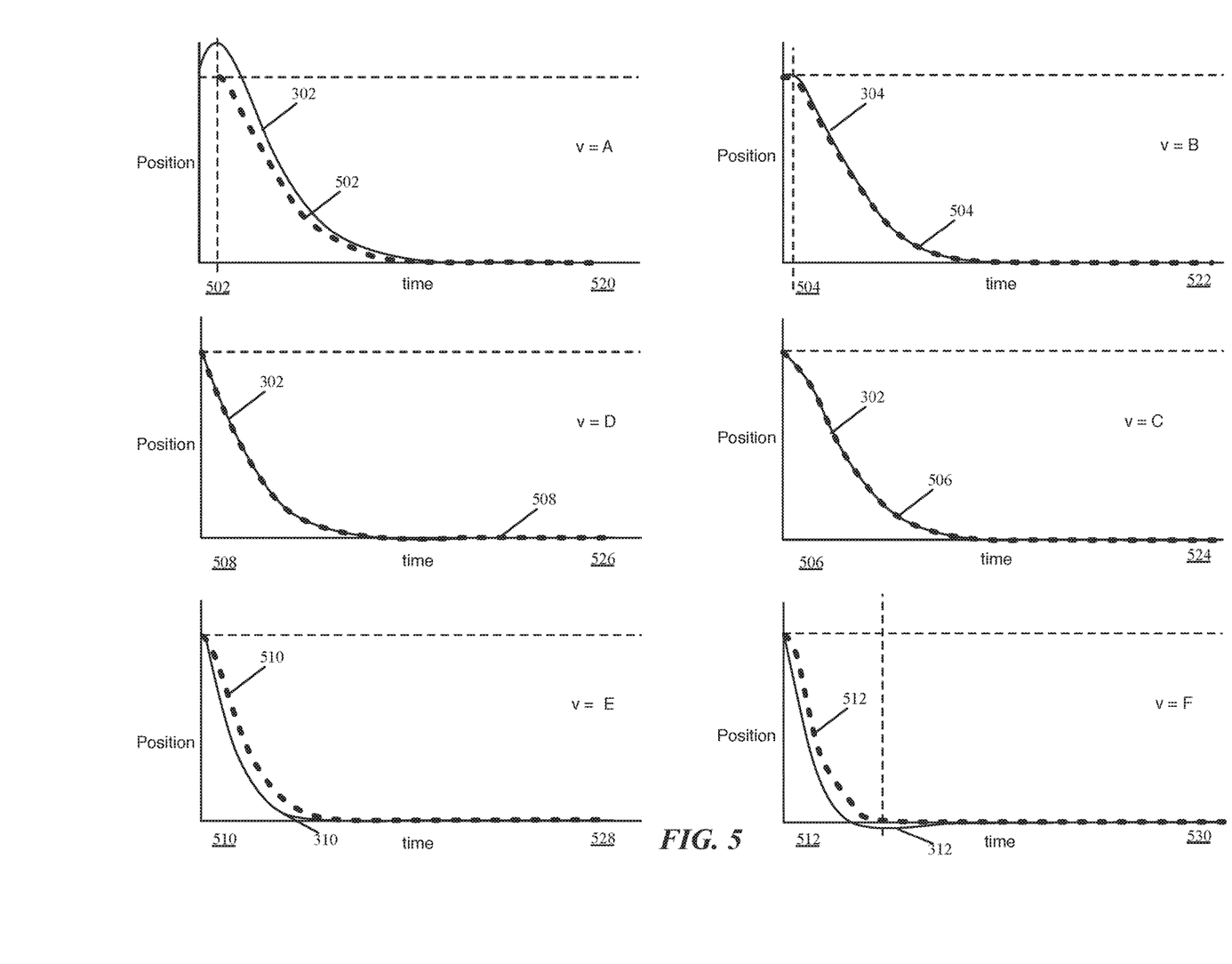
FIG. 5 illustrates two different sets of position graphs for a slow flick operation for the example of FIG. 2.

In some embodiments, the graphs of FIGS. 3 and 4 are for "faster" flick down operations that will cause the first card to reach its destination within a particular threshold time (e.g., below 0.25 seconds). For "slower" flick down operations (e.g., a flick operation that has a starting velocity that would not allow the first card to reach its destination within the particular threshold time, such as 0.25 seconds), these embodiments use different sets of first and second graphs, such as the six pairs of graphs 520-530 that are illustrated in FIG. 5. Thus, before identifying the first and second position graphs for the first and second cards 212 and 215, the process 100 initially classifies the flick of the first card 212 as either a fast flick or a slow flick in some embodiments.

The different sets of position graphs for a slow flick express different ways for moving each card and/or for aligning one card's position with respect to the other card's position. For example, some of the graphs for the first card 212 in FIG. 5 do not have a position undershoot dip at their end, while others do not have a position overshoot hump at the beginning, and yet others have neither a position overshoot at the beginning nor a position undershoot at the end. Also, in some embodiments, one pair of first and second card position graphs can intersect at one point when the first card's position catches up and passes the second card's position in FIG. 4. On the other hand, in FIG. 5, a pair of first and second card position graphs do not intersect at just one point.

After identifying the second set of values for the attribute of the second object, the process 100 uses (at 120) the first and second sets of values to display several successive presentations of the first and second animated objects. After 120, the process 100 ends. In the examples illustrated by the position graphs of FIGS. 3-5, the two concurrent animations show the first and second cards 212 and 215 moving downwards together, with the second card 215 reaching its final resting position at the moment that the first card 212 has its lowest position and is starting to bounce back to its final steady-state position.

In the example illustrated in FIG. 2, the two concurrent animations show the first and second cards 212 and 215 moving upwards together, with the second card 215 stopping its upward movement at the moment that the first card 212 has its largest bounce up position during the bounce-up portion of the first card's animation, as shown in the first-fourth stages 204-208 of FIG. 2.

FIG. 2 illustrates these two animations in four stages 202-208. The first stage 202 of FIG. 2 illustrates the user touch-selecting the first card 212 and flicking this card upwards. In this stage, the first card 212 is displayed over a map 250 presented by the map application. In the first stage 202, the velocity of the upward flick is V_F. For this velocity V_F, the process generates a position graph for the first card, and generates a position graph for the second card that has the second card reaching its destination when the first card has its maximum bounce up position during the bounce-up portion of the first card's animation. In the bounce-up portion, the first card passes its final resting position (for when the card is in a maximized state), goes up to the highest bounce up position, and then returns to its final resting position.

The second stage 204 shows the first card 212 moving upwards. This stage 204 also shows the second card 215 opening between the first card's search field 230 and its display area 235. As shown in the second stage 204 (as well as the third and fourth stages 206 and 208), the second card displays several icons that identify several categories of locations for the map application to search. Examples of such categories include Food, Drinks, Shopping, Travel, Services, Fun, Health, Transportation, etc.

The third stage 206 shows the first card 212 at its maximum height with the second card 215 fully opened underneath the first card's search field. This maximum height is past the final resting position of the first card, when this card is in its maximized state. From this maximum height, the first card 212 will bounce back as its position graph will transition through an overshoot hump to return the first card to its final resting position. In the third stage 206, the second card 215 has reached its final resting position, as the second card's position graph specifies that this card should reach its final resting position when the first card has reached its maximum overshoot value in its bounce up. The fourth stage 208 shows the first card 212 after it has reached its final resting position. At this stage, both the first and second cards 212 and 215 are in their final stationary positions. Between the third and fourth stages 206 and 208, the second card 215 remains stationary as the first card returns back to its final resting position.

In the example described above by reference to FIGS. 2-5, the two animated objects (i.e., the two cards 212 and 215) are the same type of objects and similar animations are performed for these two objects (i.e., the two animations show two cards moving synchronously upwards or downwards). The animation-synchronizing process 100 is used in some embodiments to synchronize different animations of the same type of objects, or the same or different animations of different types of objects.

Figure 6:
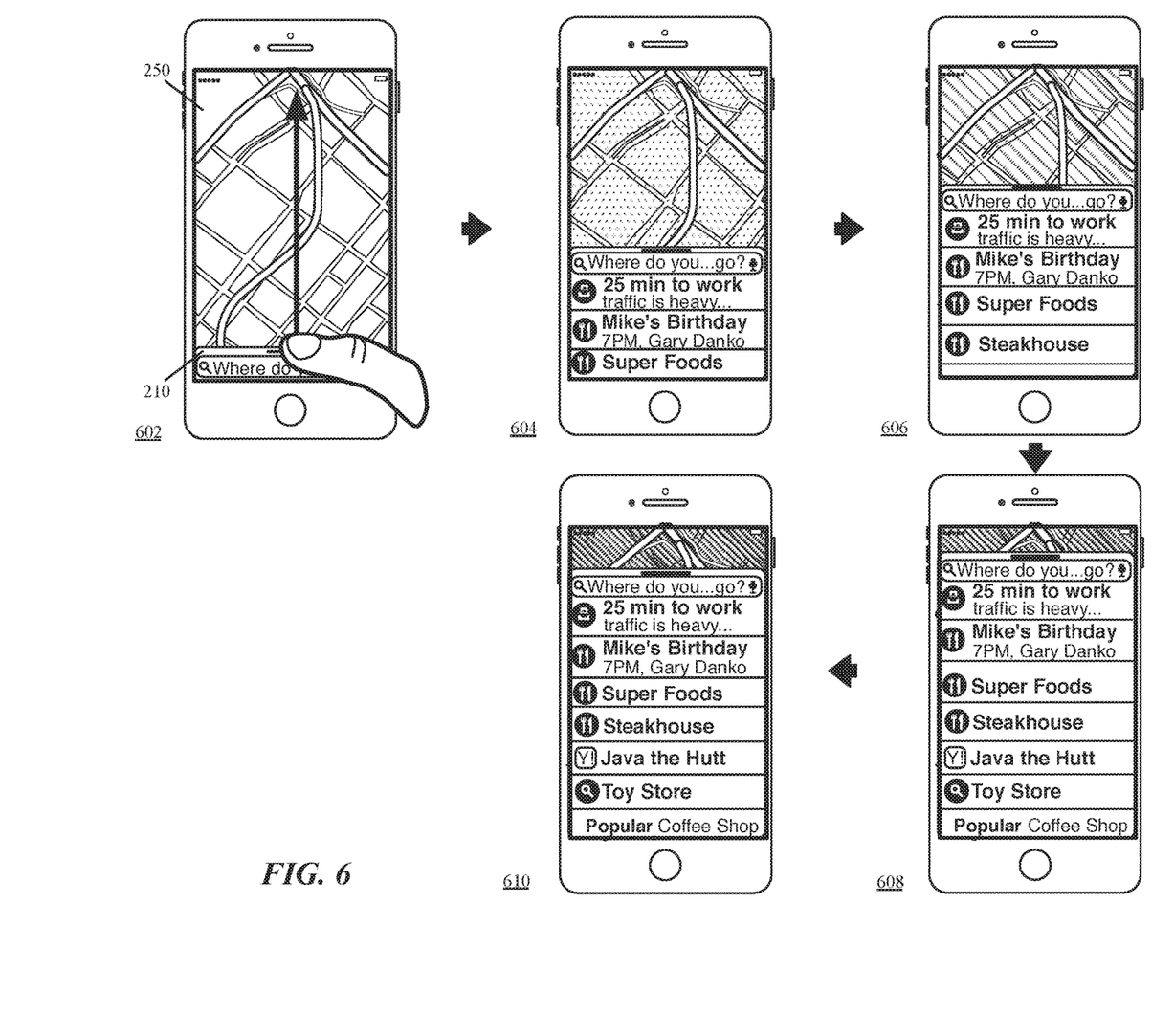
FIGS. 6 and 7 illustrate an example of synchronizing two different animations of two different types of objects.
Figure 7:
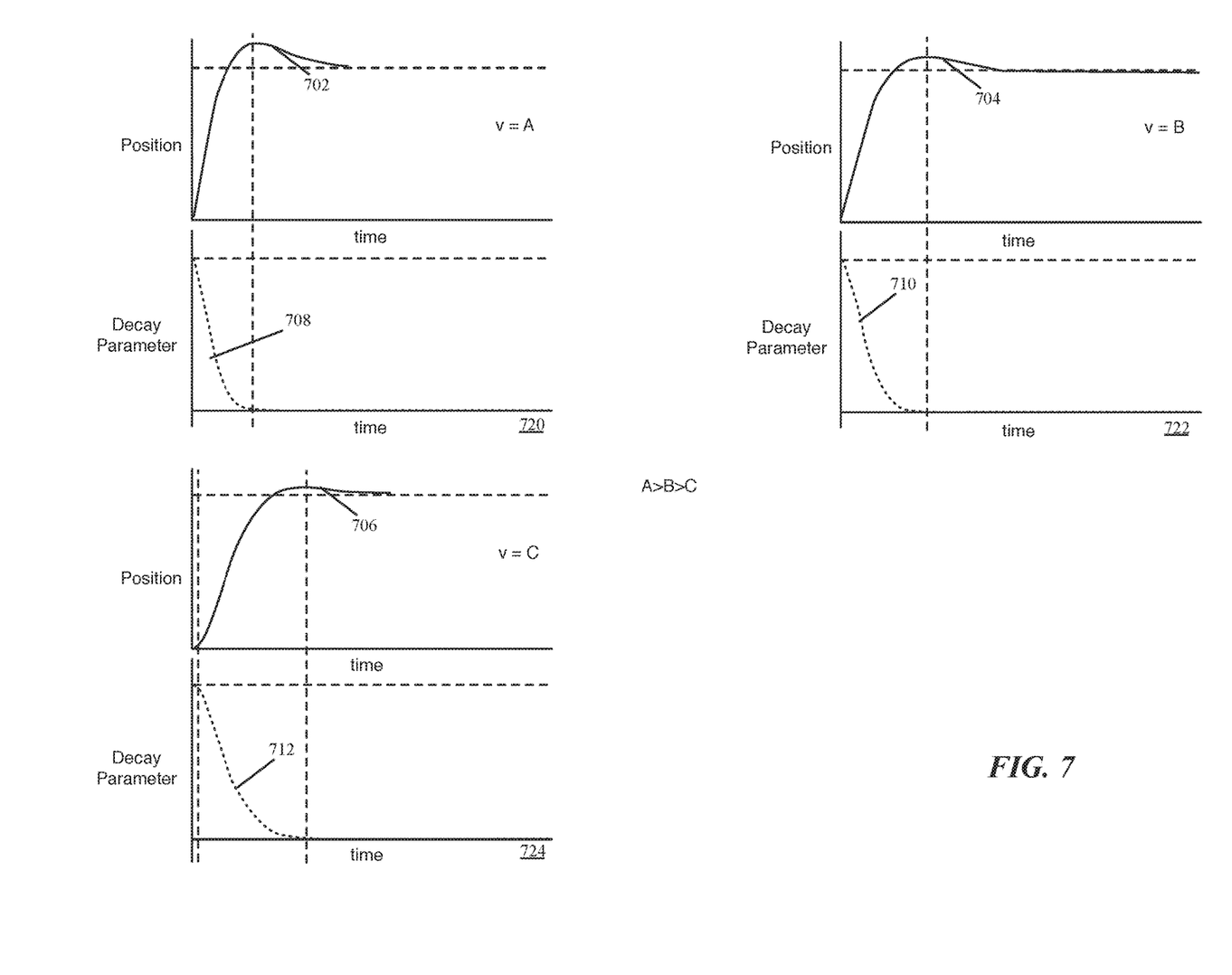

FIGS. 6 and 7 illustrate one such example. In this example, the first animated object is a card 212, while the second object is the map 250 over which the first card 212 overlays. The upward flick of the card 212 does not open the card 215 in this example. Also, in this example, the animation of the card 212 shows the card moving upwards, while the animation of the map 250 decays the luminance attribute of the map 250, in order to show the map dimming as the card moves upwards. FIG. 6 shows the dimming of the map with overlaid diagonal lines on the map, with more diagonal lines implying greater dimming of the map.

In FIG. 6, the first stage 602 shows the card 212 being flicked upwards. The second and third stages 604 and 606 show the card 212 moving upwards and the map 250 dimming. The fourth stage 608 shows the first card 212 at its maximum height during the bounce-up animation of this card. At this stage, the first card 212 has moved past its final steady-state resting position for its maximized state, and it is at its highest position during the bounce-up part of its animation.

The fifth stage 610 shows the first card after it has bounced back to its final steady-state resting position of its maximized display state (i.e., after the card has bounced back to its final stationary extended position). As shown by the third and fourth stages 606 and 608, the map continues to dim as the card moves towards its highest position in the bounce-up part of the animation. However, as shown by the fourth and fifth stages 608 and 610, the map does not get dimmer after the card 212 starts bouncing back to its final stationary extended position after reaching it has its maximum bounce-up height.

FIG. 7 illustrates three sets of animation graphs 720-724 formed by a first set of position graphs 702-706 for the card 212, and a second set of luminance-decay graphs 708-712 for the map 250. Each position graph specifies a set of position values for the card 212 for a particular flick velocity value, while the luminance-decay graph specifies a set of luminance-decay parameters for diminishing the luminance value of the map 250. In some embodiments, the luminance values of the pixels of the displayed map at any given time are multiplied by the luminance decay parameter at that time in order to generate the animation of the dimming map as the first card 212 is flipped upwards.

Unlike the position graphs of FIGS. 4 and 5, the position and luminance-decay graphs are displayed on different coordinate axes as one graph relates to position while the other graph relates to the luminance decay parameter. Also, in this example, the luminance decay parameter does not decay to zero but to a smaller value (e.g., 0.1). As shown in FIG. 7, the luminance decay value reaches its lowest value when the card's position graph is at its largest value during the bounce up portion of its animation when it temporarily passes its final stationary extended position and then returns to this position. By aligning this luminance decay value with this maximum bounce up portion and ensuring that the luminance decay parameter does not change after this point, the map application ensures that the map does not flicker during the bounce back portion of the animation (i.e., ensures that the map does not gradually dim, then get brighter, and then dim again as the card extends pasts its final resting position and then returns to this position).

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EFPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 8:
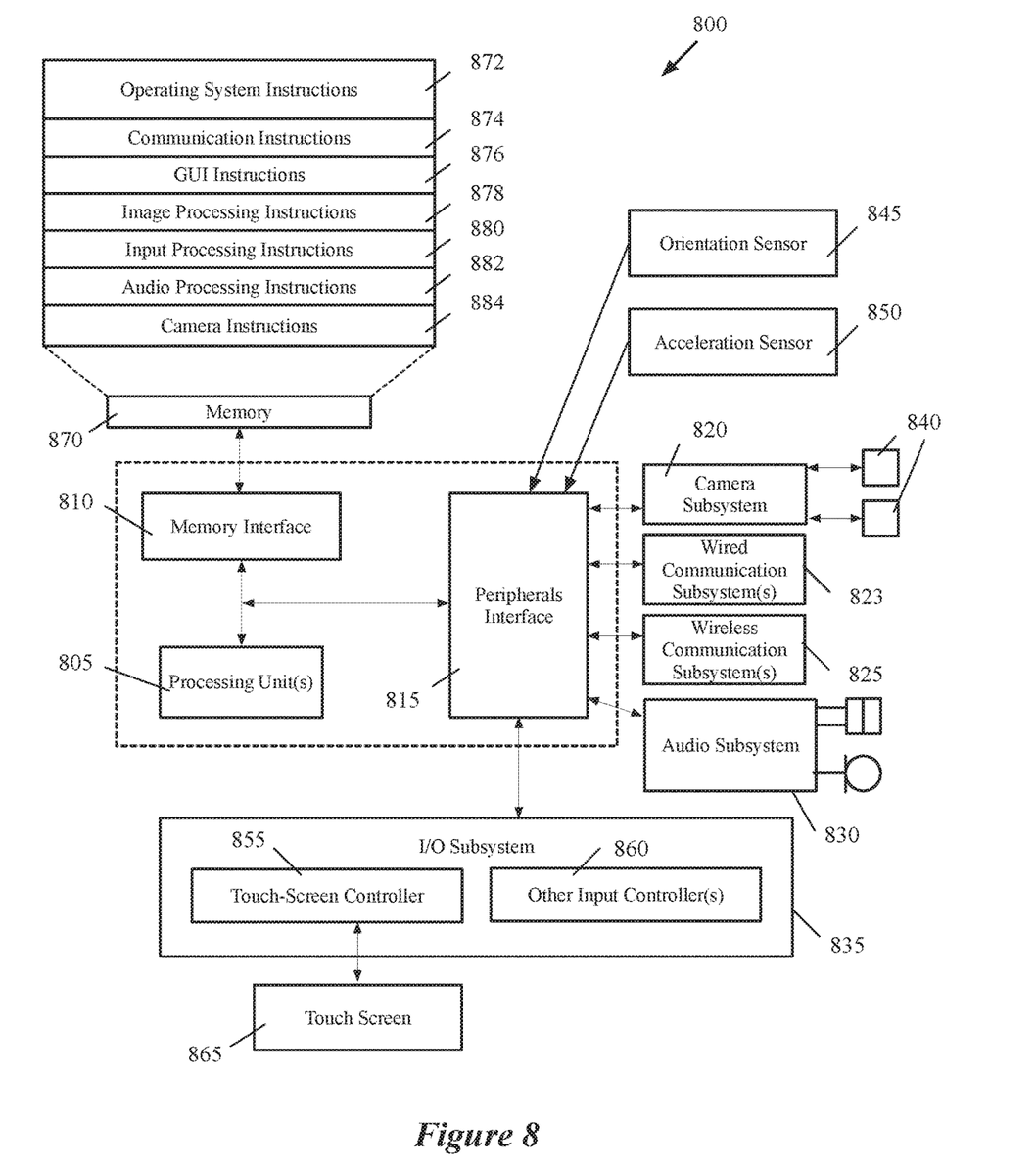
FIG. 8 conceptually illustrates an example of an electronic system with which some embodiments of the invention are implemented.

The applications of some embodiments operate on mobile devices, such as smart phones (e.g., iPhones®) and tablets (e.g., iPads®). FIG. 8 is an example of an architecture 800 of such a mobile computing device. Examples of mobile computing devices include smartphones, tablets, laptops, etc. As shown, the mobile computing device 800 includes one or more processing units 805, a memory interface 810 and a peripherals interface 815.

The peripherals interface 815 is coupled to various sensors and subsystems, including a camera subsystem 820, a wireless communication subsystem(s) 825, an audio subsystem 830, an I/O subsystem 835, etc. The peripherals interface 815 enables communication between the processing units 805 and various peripherals. For example, an orientation sensor 845 (e.g., a gyroscope) and an acceleration sensor 850 (e.g., an accelerometer) is coupled to the peripherals interface 815 to facilitate orientation and acceleration functions.

The camera subsystem 820 is coupled to one or more optical sensors 840 (e.g., a charged coupled device (CCD) optical sensor, a complementary metal-oxide-semiconductor (CMOS) optical sensor, etc.). The camera subsystem 820 coupled with the optical sensors 840 facilitates camera functions, such as image and/or video data capturing. The wireless communication subsystem 825 serves to facilitate communication functions. In some embodiments, the wireless communication subsystem 825 includes radio frequency receivers and transmitters, and optical receivers and transmitters (not shown in FIG. 8) These receivers and transmitters of some embodiments are implemented to operate over one or more communication networks such as a GSM network, a Wi-Fi network, a Bluetooth network, etc. The audio subsystem 830 is coupled to a speaker to output audio (e.g., to output voice navigation instructions). Additionally, the audio subsystem 830 is coupled to a microphone to facilitate voice-enabled functions, such as voice recognition (e.g., for searching), digital recording, etc.

The I/O subsystem 835 involves the transfer between input/output peripheral devices, such as a display, a touch screen, etc., and the data bus of the processing units 805 through the peripherals interface 815. The I/O subsystem 835 includes a touch-screen controller 855 and other input controllers 860 to facilitate the transfer between input/output peripheral devices and the data bus of the processing units 805. As shown, the touch-screen controller 855 is coupled to a touch screen 865. The touch-screen controller 855 detects contact and movement on the touch screen 865 using any of multiple touch sensitivity technologies. The other input controllers 860 are coupled to other input/control devices, such as one or more buttons. Some embodiments include a near-touch sensitive screen and a corresponding controller that can detect near-touch interactions instead of or in addition to touch interactions.

The memory interface 810 is coupled to memory 870. In some embodiments, the memory 870 includes volatile memory (e.g., high-speed random access memory), non-volatile memory (e.g., flash memory), a combination of volatile and non-volatile memory, and/or any other type of memory. As illustrated in FIG. 8, the memory 870 stores an operating system (OS) 872. The OS 872 includes instructions for handling basic system services and for performing hardware dependent tasks.

The memory 870 also includes communication instructions 874 to facilitate communicating with one or more additional devices; graphical user interface instructions 876 to facilitate graphic user interface processing, image processing instructions 878 to facilitate image-related processing and functions; input processing instructions 880 to facilitate input-related (e.g., touch input) processes and functions, audio processing instructions 882 to facilitate audio-related processes and functions; and camera instructions 884 to facilitate camera-related processes and functions. The instructions described above are merely exemplary and the memory 870 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 8 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 8 may be split into two or more integrated circuits.

Figure 9:
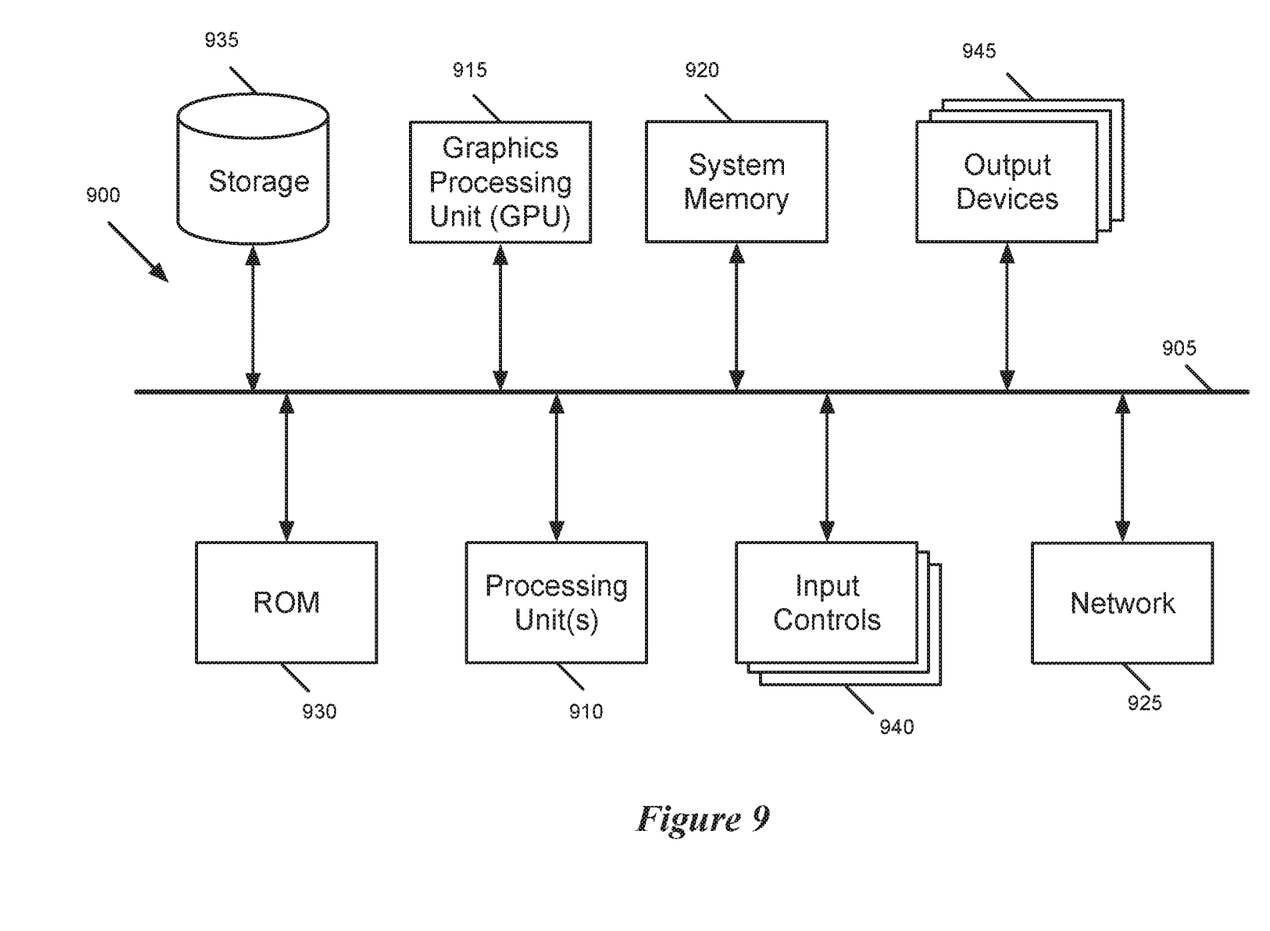
FIG. 9 conceptually illustrates another example of an electronic system with which some embodiments of the invention are implemented.

FIG. 9 conceptually illustrates another example of an electronic system 900 with which some embodiments of the invention are implemented. The electronic system 900 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 900 includes a bus 905, processing unit(s) 010, a graphics processing unit (GPU) 915, a system memory 920, a network 925, a read-only memory 930, a permanent storage device 935, input devices 940, and output devices 945.

The bus 905 collectively represents all system, peripheral, and chipset buses that communicatively connect the numerous internal devices of the electronic system 900. For instance, the bus 905 communicatively connects the processing unit(s) 910 with the read-only memory 930, the GPU 915, the system memory 920, and the permanent storage device 935.

From these various memory units, the processing unit(s) 910 retrieves instructions to execute and data to process in order to execute the processes of the invention. The processing unit(s) may be a single processor or a multi-core processor in different embodiments. Some instructions are passed to and executed by the GPU 915. The GPU 915 can offload various computations or complement the image processing provided by the processing unit(s) 910.

The read-only-memory (ROM) 930 stores static data and instructions that are needed by the processing unit(s) 910 and other modules of the electronic system. The permanent storage device 935, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive, integrated flash memory) as the permanent storage device 935. Other embodiments use a removable storage device (such as a floppy disk, flash memory device, etc., and its corresponding drive) as the permanent storage device. Like the permanent storage device 935, the system memory 920 is a read-and-write memory device. However, unlike storage device 935, the system memory 920 is a volatile read-and-write memory, such a random access memory. The system memory 920 stores some of the instructions and data that the processor needs at runtime. In some embodiments, the invention's processes are stored in the system memory 920, the permanent storage device 935, and/or the read-only memory 930. For example, the various memory units include instructions for processing multimedia clips in accordance with some embodiments. From these various memory units, the processing unit(s) 910 retrieves instructions to execute and data to process in order to execute the processes of some embodiments.

The bus 905 also connects to the input and output devices 940 and 945. The input devices 940 enable the user to communicate information and select commands to the electronic system. The input devices 940 include alphanumeric keyboards and pointing devices (also called "cursor control devices"), cameras (e.g., webcams), microphones or similar devices for receiving voice commands, etc. The output devices 945 display images generated by the electronic system or otherwise output data. The output devices 945 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 9, bus 905 also couples electronic system 900 to a network 925 through a network adapter (not shown). In this manner, the computer can be a part of a network of computers (such as a local area network ("LAN"), a wide area network ("WAN"), or an Intranet), or a network of networks, such as the Internet. Any or all components of electronic system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, FIG. 1 conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. One of ordinary skill in the art would understand that the invention is not to be limited by the foregoing illustrative details, but rather is to be defined by the appended claims.

What is claimed is:

1. A method comprising:
   receiving, by a mapping application, a user input moving in a first direction from a first edge of a first display area;
   responsive to the user input: initiating a first animation for a second display area that gradually reveals the second display area to partially overlap the first display area, the second display area comprising a plurality of interface elements, the second display area having a first attribute;
   during the first animation:
   causing the second display area to travel a first distance in the first direction; and
   determining that a first attribute value for the first attribute has crossed a first threshold;
   based on determining that that the first attribute value for the first attribute has crossed the first threshold, presenting a second animation for the second display area that bounces the second display area in a direction opposite the first direction; and
   causing the second display area to travel a second distance in the direction opposite the first direction during the second animation, wherein the second distance is less than the first distance.

2. The method as recited in claim 1, wherein the second display area extends from an edge of the first display area.

3. The method as recited in claim 1, wherein the first attribute is a distance of a leading edge of the second display area from a second edge of the first display area opposite the first edge of the first display area.

4. The method as recited in claim 1, wherein the first attribute is a size of the second display area that has been revealed during the first animation.

5. The method as recited in claim 1, further comprising defining the first attribute value by identifying, based on the user input, a graph that specifies several different values for the first attribute over a duration of the first animation.

6. The method as recited in claim 5, wherein the graph defines a first plurality of values for the first attribute to correspond to a slow flick gesture and a second plurality of values for the first attribute to correspond to a fast flick gesture.

7. The method as recited in claim 1, wherein the first threshold is a position relative to a second edge of the first display area opposite the first edge of the first display area.

8. The method of claim 1, wherein each interface element among the plurality of interface elements comprises at least one of: a search field, a graphical icon, or a location.

9. The method of claim 1, wherein each interface element among the plurality of interface elements comprises at least one of: a field adapted to receive input, a selectable interface element, or a non-selectable interface element.

10. The method of claim 1, wherein each of the plurality of interface elements are sub-elements of a particular GUI element.

11. The method of claim 1, wherein the plurality of interface elements, comprised in the second display area, includes a search field that moves in accordance with movement of the second display area.

12. The method of claim 1, further comprising:
   during the first animation: reducing a luminance attribute of the first display area.

13. The method of claim 1, further comprising:
   wherein during the first animation: when the second display area partially overlaps the first display area, the second display area covers all portions of the first display area that are below a highest position currently covered by the second display area.

14. A non-transitory machine readable medium storing sets of instructions that, when executed by at least one processing unit, perform operations comprising:
   receiving, by a mapping application, a user input moving in a first direction from a first edge of a first display area;
   responsive to the user input: initiating a first animation for a second display area that gradually reveals the second display area to partially overlap the first display area, the second display area comprising a plurality of interface elements, the second display area having a first attribute;
   during the first animation:
   causing the second display area to travel a first distance in the first direction; and
   determining that a first attribute value for the first attribute has crossed a first threshold;
   based on determining that that the first attribute value for the first attribute has crossed the first threshold, presenting a second animation for the second display area that bounces the second display area in a direction opposite the first direction; and
   causing the second display area to travel a second distance in the direction opposite the first direction during the second animation, wherein the second distance is less than the first distance.

15. The non-transitory machine readable medium as recited in claim 14, wherein the second display area extends from an edge of the first display area.

16. The non-transitory machine readable medium as recited in claim 14, wherein the first attribute is a distance travelled of a leading edge of the second display area from a second edge of the first display area opposite the first edge of the first display area during the first animation.

17. The non-transitory machine readable medium as recited in claim 14, wherein the first attribute is a size of the second display area that has been revealed during the first animation.

18. The non-transitory machine readable medium as recited in claim 14, wherein the operations further comprise defining the first attribute value by identifying, based on the user input, a graph that specifies several different values for the first attribute over a duration of the first animation.

19. The non-transitory machine readable medium as recited in claim 18, wherein the graph defines a first plurality of values for the first attribute to correspond to a slow flick gesture and a second plurality of values for the first attribute to correspond to a fast flick gesture.

20. The non-transitory machine readable medium as recited in claim 14, wherein the first threshold is a position relative to a second edge of the first display area opposite the first edge of the first display area.

21. A system comprising:

at least one processing unit; and a non-transitory machine readable medium storing sets of instructions that, when executed by the at least one processing unit, perform operations comprising:

receiving, by a mapping application, a user input moving in a first direction from a first edge of a first display area;

responsive to the user input: initiating a first animation for a second display area that gradually reveals the second display area to partially overlap the first display area, the second display area comprising a plurality of interface elements, the second display area having a first attribute;

during the first animation:

causing the second display area to travel a first distance in the first direction; and determining that a first attribute value for the first attribute has crossed a first threshold;

based on determining that that the first attribute value for the first attribute has crossed the first threshold, presenting a second animation for the second display area that bounces the second display area in a direction opposite the first direction; and causing the second display area to travel a second distance in the direction opposite the first direction during the second animation, wherein the second distance is less than the first distance.

22. The system as recited in claim 21, wherein the second display area extends from an edge of the first display area.

23. The system as recited in claim 21, wherein the first attribute is a distance travelled of a leading edge of the second display area from a second edge of the first display area opposite the first edge of the first display area during the first animation.

24. The system as recited in claim 21, wherein the first attribute is a size of the second display area that has been revealed during the first animation.

25. The system as recited in claim 21, wherein the operations further comprise defining the first attribute value by identifying, based on the user input, a graph that specifies several different values for the first attribute over a duration of the first animation.

26. The system as recited in claim 25, wherein the graph defines a first plurality of values for the first attribute to correspond to a slow flick gesture, and wherein the graph defines a second plurality of values for the first attribute to correspond to a fast flick gesture.

\* \* \* \* \*